United States Patent [19]

Yokomatsu et al.

[11] Patent Number: 5,076,614
[45] Date of Patent: Dec. 31, 1991

[54] HOSE FITTING

[75] Inventors: Takahiro Yokomatsu; Kenji Mine; Shinichiro Kato, all of Tokyo, Japan

[73] Assignee: Bridgestone Flowtech Corp., Tokyo, Japan

[21] Appl. No.: 649,197

[22] Filed: Feb. 4, 1991

Related U.S. Application Data

[60] Continuation of Ser. No. 370,792, Jun. 23, 1989, abandoned, which is a division of Ser. No. 230,869, Aug. 11, 1988, abandoned.

[30] Foreign Application Priority Data

Sep. 29, 1987 [JP] Japan ............................ 62-246770
Mar. 8, 1988 [JP] Japan ............................ 63-55389

[51] Int. Cl.$^5$ ............................................ F16L 25/00
[52] U.S. Cl. .......................................... 285/101; 285/98; 285/243; 285/276; 285/256
[58] Field of Search ........................... 285/238-243, 285/255-257, 259, 95, 98, 101, 174, 272, 273, 276, 275

[56] References Cited

U.S. PATENT DOCUMENTS

| | | | |
|---|---|---|---|
| 1,098,294 | 5/1914 | Patty | 285/259 |
| 1,428,949 | 9/1922 | Eastman | 285/259 |
| 2,120,275 | 6/1938 | Cowles | 285/243 |
| 2,407,745 | 9/1946 | Jacobson | 285/278 |
| 2,466,526 | 4/1949 | Wolfram . | |
| 2,480,174 | 8/1949 | Yost | 285/276 |
| 3,097,866 | 7/1963 | Iversen | 285/18 |
| 3,222,091 | 12/1965 | Marshall | 285/243 |
| 3,409,314 | 11/1968 | Roe . | |
| 3,999,783 | 12/1976 | Legris . | |
| 4,157,843 | 6/1979 | Trnka | 285/259 |
| 4,212,487 | 7/1980 | Jones et al. | 285/243 |
| 4,220,029 | 10/1980 | Boyer et al. . | |
| 4,220,359 | 9/1980 | Evenson et al. . | |
| 4,282,175 | 8/1981 | Volgstadt et al. . | |
| 4,431,216 | 2/1984 | Legris . | |
| 4,445,714 | 5/1984 | Kisiel, III . | |
| 4,498,691 | 2/1985 | Cooke | 285/256 |
| 4,712,813 | 12/1987 | Passerell et al. . | |
| 4,775,171 | 10/1988 | Marshall | 285/101 |

FOREIGN PATENT DOCUMENTS

| | | |
|---|---|---|
| 81547 | 8/1963 | France . |
| 406205 | 3/1943 | Italy . |
| 0520608 | 3/1955 | Italy . |
| 678423 | 12/1964 | Italy . |
| 495698 | 11/1938 | United Kingdom . |

Primary Examiner—Dave W. Arola
Assistant Examiner—Carol I. Bordas
Attorney, Agent, or Firm—Lane, Aitken & McCann

[57] ABSTRACT

A hose fitting for sealed connection to a hose includes: a first cylindrical member having a small diameter bore portion and a large diameter bore portion connected to the small diameter bore portion. A second cylindrical member is axially slidable within the large diameter bore portion and has a radial flange portion and an axial tubular portion extending from the radial flange portion, the radial flange portion being provided with a sealing member and the axial tubular portion being provided with a sealing member. A sleeve is provided within the large diameter bore portion and has an inclined surface. A collet is provided within the large diameter bore portion and has an outer surface engageable with the inclined surface of the sleeve and radially constrictible when moving axially within the sleeve, the hose being firmly fixed between the collet and the axial tubular portion of the second cylindrical member by axial outward movement of the collet. A stop member received in the large diameter bore portion is adapted to limit axial movement of the sleeve and collet; and means for permitting the sleeve and the collet to rotate about an axis of the first cylindrical member, the means being disposed between the sleeve and the stop member.

1 Claim, 8 Drawing Sheets

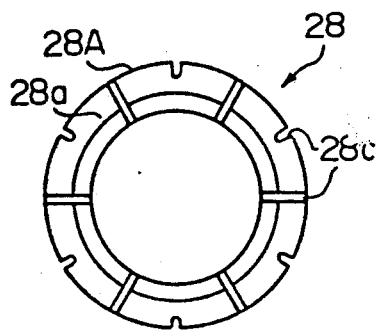
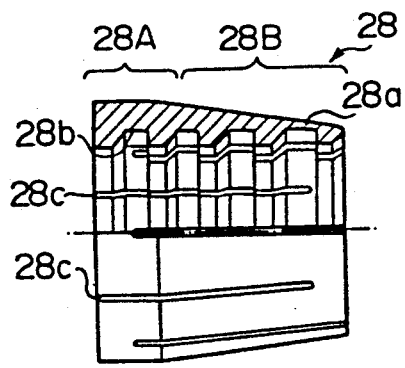
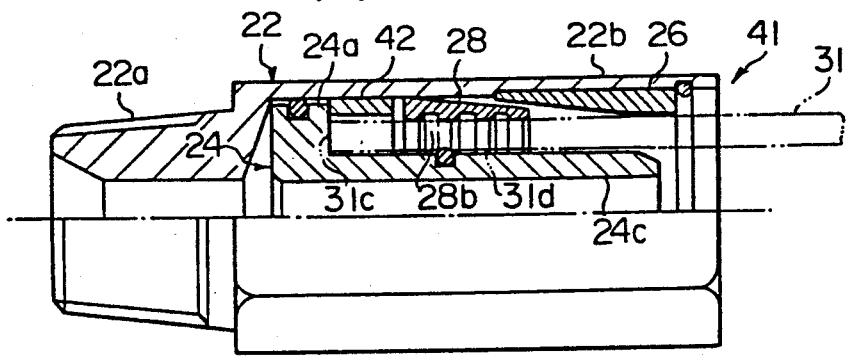
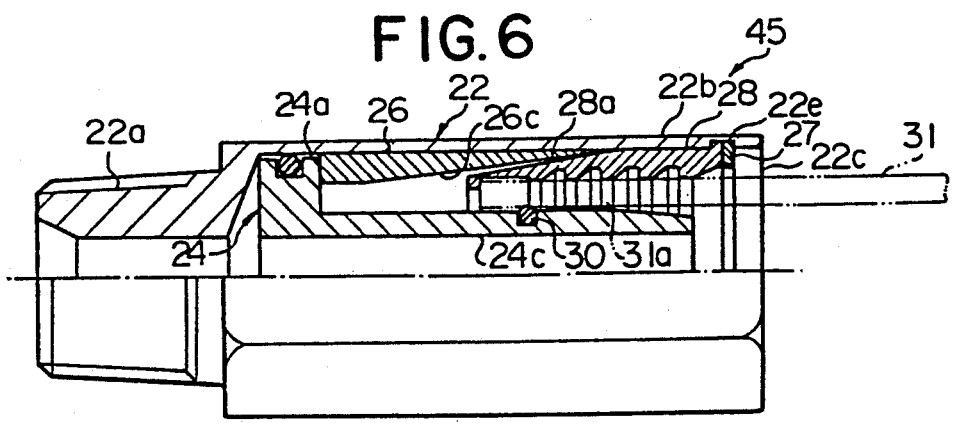

PRIOR-ART

PRIOR-ART

PRIOR-ART

PRIOR-ART

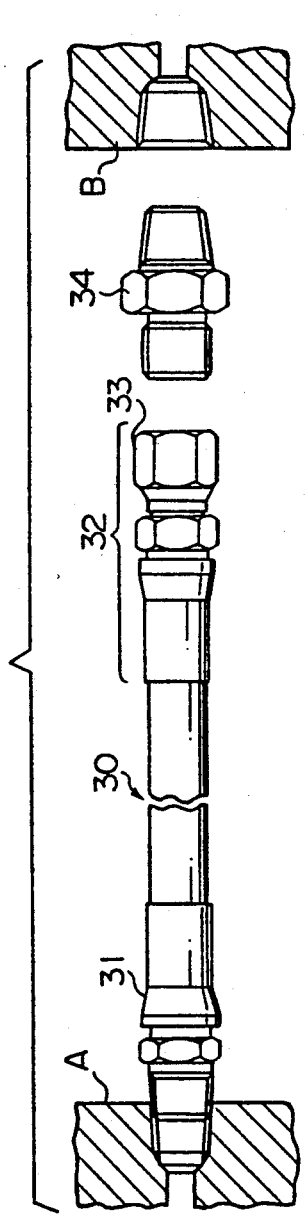
FIG.18(a) PRIOR-ART
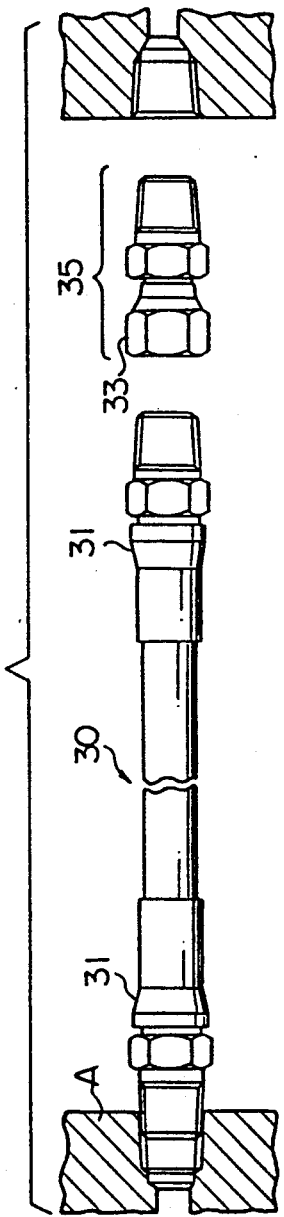
FIG.18(b) PRIOR-ART
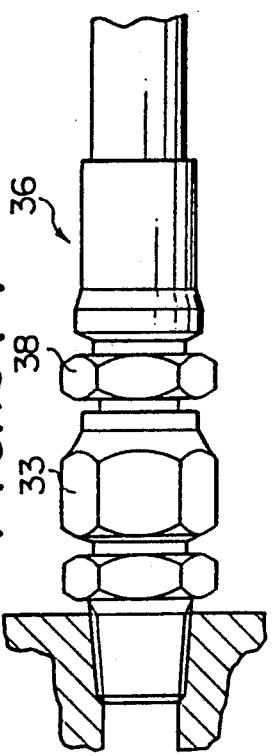
FIG.18(c) PRIOR-ART

HOSE FITTING

This application is a continuation of application Ser. No. 370,792, filed June 23, 1989, which is a division of Ser. No. 230,869, filed Aug. 11, 1988, both now abandoned.

FIELD OF THE INVENTION

The present invention relates in general to hose fittings, and in particular to hose fittings for use with a hose having a composite construction formed by an inner tube, an intermediate reinforcing layer and an outer cover.

DESCRIPTION OF THE PRIOR ART

A hydraulic hose employed in the fluid passageway of high-pressure fluid having a relatively high pressure of more than 30 kg/cm$^2$ normally has a composite construction formed by an inner tube, an intermediate reinforcing layer and an outer cover. There are two kinds of hose fittings used in the connection of such a hose thereto; one is a crimping type and another is a noncrimping type.

A conventional hose fitting of the former type is shown in FIG. 15 for example. In FIG. 15, a hose fitting 1 comprises a core member 2 and a crimping member 3 attached to the core member 2. To the hose fitting 1 is inserted a hose 8 which is formed by an inner tube 5, an intermediate reinforcing layer 6 and an outer cover 7. In the connection of the hose 8 to the hose fitting 1, the crimping member 3 of the hose fitting 1 is crimped by crimping machines and the hose 8 is locked between the crimping member 3 and the axial tubular portion 2a of the core member 2. For this reason, such hose fitting has disadvantages in that special crimping machines are required in the connection of the hose to the fitting and that the fitting cannot be used where the length adjustment of the hose 8 is required.

A conventional hose fitting of the noncrimping type is shown in FIGS. 16(a) and 16(b) for example. In FIGS. 16(a) and 16(b), a hose fitting 11 is a reusable fitting and comprises a core member 12 having at its axial tubular portion 12a a male thread 12b, and a crimping member 13 having a radially inner flange portion 13a which mates with the male thread 12b of the core member 12. In the connection of the aforesaid composite construction hose 8 to the hose fitting 11, the crimping member 13 is first attached to the hose 8 by a vice, etc., and then the tubular portion 12a of the core member 12 is inserted into the hose 8 by a spanner, etc. to complete the connection. Such fitting however has disadvantages in that suitable crimping tools such as vices, spanners and the like are required in the connection and that the operational efficiency is not satisfactorily as the connection takes substantial time.

Some prior art quick hose fittings described in Japanese Utility Model laid-open publication No. 55-98888 and Japanese Utility Model publication No. 61-4796 have been proposed as shown in FIG. 17. The quick hose fitting 15 shown in FIG. 17 has a cylindrical fitting body 16, an annular sealing ring 18 for sealing a monolayer tubing 17 inserted within the fitting body 16, and a chuck 19 for gripping the tubing 17. The fluid within the tubing 17 is sealed by the radially inward pressing engagement of the sealing ring 18 with the tubing 17. For this reason, if a hose of composite construction is connected to the known quick hose fitting of the above type, the hose tends to bulge due to the fluid that entered the reinforcing layer of the hose from the hose end and the fluid tends to leak, because the reinforcing layer is braided out of fibers and thus has spaces between the fibers. The tubing 17 is gripped by the sharp claw portion 19a of the chuck 19. For this reason, the quick hose fitting 15 tends to tear the outer cover of the tubing 17 and disconnect the tubing 17 therefrom, and therefore cannot be adapted to the composite hose. Further, the quick hose fitting 15 was one that cannot be used in a system generating a fluid pressure of more than 30 kg/cm$^2$, by reason that the pressure resistance of the hose fitting 15 itself is relatively low and that the hose fitting 15 is designed to be used in a hose of monolayer construction under a pressure of less than 20 kg/cm$^2$.

Also, there is another conventional hose fitting proposed in Japanese Utility Model publication No. 58-17193. This fitting is constructed such that a tube end is gripped between the bulged portion of an axially slidable cylindrical member located inside the tube and the crimping finger located outside the tube, by the axial outward movement of the cylindrical member. However, in the case that the repeated rupture pressure of fluid exceeds more than 30 kg/cm$^2$, the repeated stresses are concentrated upon the bulged portion and the crimping finger, and finally there will be an occurrence of the tear of the hose and an occurrence of the disconnection of the hose from the fitting, since the bulged portion and crimping finger each have substantially no axial length.

In the case only the damaged portion of a hose is repaired in an apparatus having a high-pressure piping system, that portion is first removed, and it was necessary to connect the remaining two parts after connectors are attached to the two parts by crimping, etc. For this reason, the remaining two hoses must be removed from the apparatus in order to attach the connectors to the hoses by crimping and it was necessary to rearrange the piping system after the attachment of the connectors to the hoses. Thus, there was the disadvantage of requiring substantial labor and time. In the case of a new hose, there is also the drawback that, when the length of a hose is required which is longer than the maximum length of the new hose, an intermediate hose fitting is required as the length of the hose is limited in the transportation of hose or in the maintenance of hose.

In the connection of a hose to an apparatus having a high-pressure piping system, as shown in FIG. 18(a), a hose assembly 30, wherein crimping metal fittings are mounted on the opposite ends of a hose, has heretofore used at least one end thereof a crimping metal fitting 32 with a union nut 33 not so as to twist the hose. A crimping metal fitting 31 mounted on one end of the hose assembly 31 is first threaded into an apparatus A by rotating the hose assembly 31, and then the union nut 33 of the metal fitting 32 is threaded onto an adapter 34 threaded in advance into an apparatus B. Alternatively, the hose assembly 30 uses at its opposite ends crimping metal fittings 31 with male threads, as shown in FIG. 18(b). The apparatuses A and B are connected with each other by the use of a connecting adapter 35 with a union nut 33. In both cases, the hose assembly 30 requires an additional union nut or adapter. Further, in the connection of the union nut 33, the fixed nut 38 of a crimping metal fitting 36 shown in FIG. 18(c) must be fixed by special tools such as spanners in order to prevent the twisting of the hose caused by the turning of the nut 33.

Accordingly, it is an object of the present invention to provide an improved hose fitting which solves all of the foregoing drawbacks.

SUMMARY OF THE INVENTION

In accordance with an important aspect of the present invention, there is provided a hose fitting for sealed connection to a hose, comprising: a first cylindrical member having a small diameter bore portion and a large diameter bore portion connected to the small diameter bore portion, the small diameter bore portion being formed with an axial small bore extending therethrough and the large diameter bore portion being formed with an axial large bore extending therethrough; a second cylindrical member axially slidable within the large diameter bore portion of the first cylindrical member and having a radial flange portion and an axial tubular portion extending from the radial flange portion, the radial flange portion being provided with a sealing member and the axial tubular portion being formed with a through bore communicating with the axial small bore of the small diameter bore portion of the first cylindrical member and provided with a sealing member; a sleeve provided within the large diameter bore portion and having an inclined surface; a collet provided within the large diameter bore portion and having an outer surface engageable with the inclined surface of the sleeve and radially constrictible when moving axially within the sleeve, the hose being firmly fixed between the collet and the axial tubular portion of the second cylindrical member by axial outward movement of the collet; a stop member received in the large diameter bore portion and adapted to limit axial movement of the sleeve and collet; and means for permitting the sleeve and the collet to rotate about an axis of the first cylindrical member, the means being disposed between the sleeve and the stop member.

BRIEF DESCRIPTION OF THE DRAWINGS

The drawbacks of a conventional hose fitting and the features and advantages of a hose fitting according to the present invention will be more clearly understood from the following description taken in conjunction with the accompanying drawings:

FIG. 3 is an end view showing the collet shown in FIG. 1;

FIG. 4 is a part-sectional view showing the collet shown in FIG. 3;

FIG. 5 is a longitudinal side view, partly in section, showing a hose fitting constructed in accordance with a second embodiment of the present invention;

FIG. 6 is a longitudinal side view, partly in section, showing a hose fitting constructed in accordance with a third embodiment of the present invention;

FIG. 18(a), 18(b) and 18(c) are schematic views showing the connection of the conventional hose fitting to apparatuses.

DESCRIPTION OF THE PREFERRED EMBODIMENTS

Figure 1:
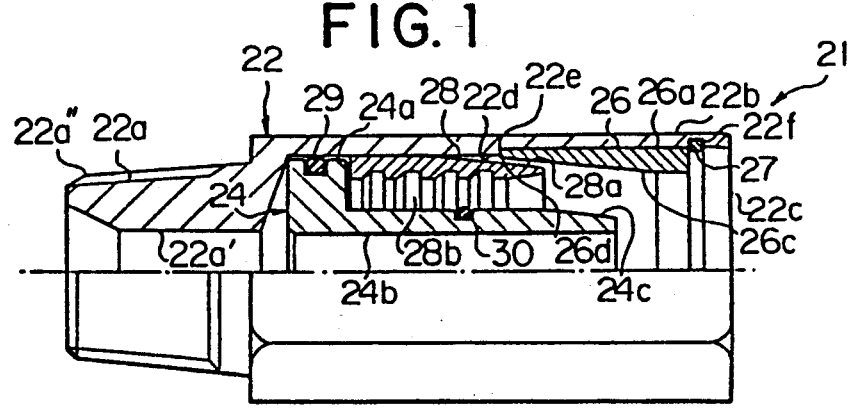
FIG. 1 is a longitudinal side view, partly in section, showing a hose fitting constructed in accordance with a first embodiment of the present invention.

Referring now in greater detail to the drawings and initially to FIGS. 1 to 4, there is shown a hose fitting 21 constructed in accordance with a first preferred embodiment of the present invention. The hose fitting 21 comprises a body 22 as a first cylindrical member and a core member 24 as a second cylindrical member which is disposed in coaxial relationship to the body 22. The body 22 of the hose fitting 21 has an axially inner small diameter bore portion 22a formed with an axially inner small bore 22a' extending therethrough and a male thread 22a" for connecting the body 22 to another part of the fluid system (not shown), and further has an axially outer large diameter bore portion 22b connected to the small diameter bore portion 22a and formed with an axially outer large bore 22d extending therethrough. The core member 24 of the hose fitting 21 has a radial flange portion 24a axially slidable within the bore 22d of the large diameter bore portion 22b, and an axial tubular portion 24c extending axially outwardly from the radial flange portion 24a and formed with an axial through bore 24b communicating with the axially inner bore 22a' of the small diameter bore portion 22a. The large diameter bore portion 22b of the body 22 is provided at its axially outer end portion 22c with a cylindrical retaining sleeve 26. The cylindrical sleeve 26 has its outer surface 26a received in a recess 22e in the large diameter bore portion 22b, and the axial movement of the cylindrical sleeve 26 is limited by an annular stop ring 27 received in a circumferential groove 22f in the large diameter bore portion 22b. The cylindrical sleeve 26 has a radially inner frustoconical surface 26c narrowing toward the outer end portion 22c of the large diameter bore portion 22b. A cylindrical collet 28 made of steel is provided within the large diameter bore portion 22b of the body 22, and has a radially outer frustoconical surface 28a narrowing toward the outer end portion 22c of the large diameter bore portion 22b at an angle corresponding to the angle of the inner frustoconical surface 26c of the sleeve 26 and engaging the inner frustoconical surface 26c. The collet 28 is formed at its inner surface with a plurality of circumferential groove and land portions 28b, so that it can effectively constrict radially inwardly when axially outwardly moving within the sleeve 26. As shown in FIGS. 3 and 4, the collet 28 is further formed with a plurality of axial slits 28c so that the collet 28 can maintain its form and surely constrict radially inwardly even under constricting and crimping load. An O-ring 29 is received in a circumferential groove formed in the flange portion 24a of the core member 24 to form a seal between the large diameter bore portion 22b of the body 22 and the flange portion 24a of the core member 24. An O-ring 30 is received in a circumferential groove formed in the axial tubular portion 24c of the core member 24 in opposing relationship to the circumferential land portion 28b of the collet 28, and is adapted to form a seal between the axial tubular portion 24c and the inner tube of a hose 31 inserted on the axial tubular portion 24c.

In the make-up of the aforesaid hose fitting 21, the O-ring 29 is inserted into the circumferential groove of the flange portion 24a of the core member 24, and the O-ring 30 is inserted into the circumferential groove of the axial tubular portion 24c of the core member 24. The core member 24 is then inserted into the bore 22d of the large diameter bore portion 22b from the axially outer end portion 22c until the flange portion 24a of the core member 24 abuts the small diameter bore portion 22a, and furthermore the collet 28 is inserted until the axially inner end face thereof abuts the flange portion 24a of the core member 24. Thereafter, the retaining sleeve 26 is inserted within the large diameter bore portion 22b of the body 22 and fixed by the recess 22e and the annular stop ring 27.

Figure 2A:
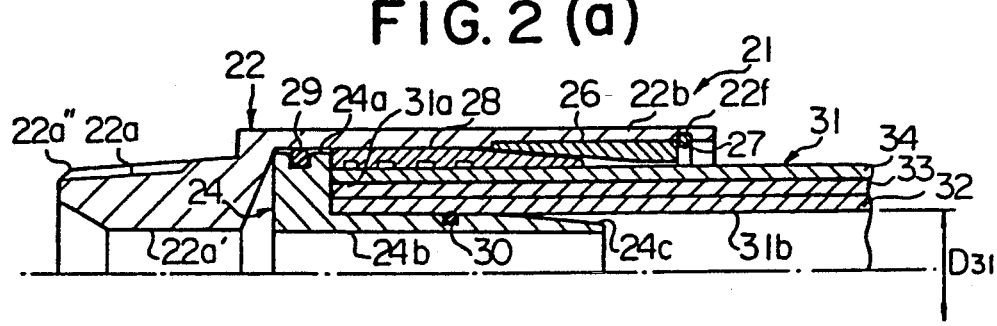
FIG. 2(a) is a fragmentary longitudinal sectional view showing a hose inserted to the fully inserted position wherein the hose end abuts the flange portion of the core member shown in FIG. 1.
Figure 2B:
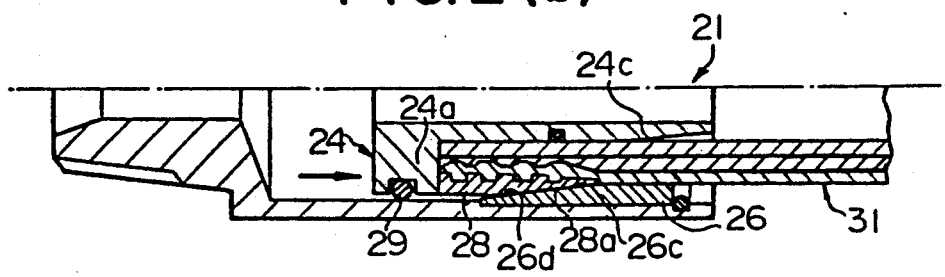
FIG. 2(b) is a view similar to FIG. 2(a) showing the hose connected to the hose fitting by the axial outward movement of the core member shown in FIG. 2(a) from the position of FIG. 2(a)

As shown in FIG. 2(a), the aforesaid hose 31 is a high-pressure hose of a composite construction having an inner diameter $D_{31}$ of 9.5 mm, and comprises an inner tube 32 made of nylon resin, an intermediate reinforcing layer 33 made of polyester fiber, and an outer cover 34 made of polyurethan. The distal end 31a of the hose fitting 31 passes axially inwardly and is inserted to the fully inserted position of FIG. 2(a) wherein the end 31a abuts the flange portion 24a of the core member 24. If an internal pressure is applied through the bore 22a' to the axially inner end surface of the core member 24, the core member 24 is caused to move axially outwardly toward the sleeve 26. As shown in FIG. 2(b), the axial outward movement of the core member 24 from the fully inserted position of FIG. 2(a) now causes the collet 28 to be moved axially outwardly so as to bring the outer frustoconical surface 28a of the collet 28 into engagement with the inner frustoconical surface 26c of the sleeve 26. As a result of the movement of the collet 28, the collet 28 is constricted radially inwardly so that the hose 31 is crimped by the collet 28 and the axial tubular portion 24c of the core member 24.

The operation of the hose fitting constructed as described above will hereinafter be described in detail. The hose 31 is inserted to the fully inserted position of FIG. 2(a) wherein the distal end 31a abuts the flange portion 24a of the core member 24. The inner surface 31b of the inserted hose 31 engages the O-ring 30 in the axial tubular portion 24b of the core member 24 and thereby forms a seal between the inner tube 32 of the hose 31 and the tubular portion 24b, and even in the case of zero pressure or substantially zero pressure within the hose fitting 21, there is no leak of fluid. As the hose fitting 21 of the present invention has within the large diameter bore portion 22b of the body 22 the sleeve 26 and the collet 28, if internal pressure is applied to the hose fitting 21, the flange portion 24a of the core member 24 is caused to move axially outwardly toward the sleeve due to the internal pressure within the small diameter bore portion 22, and at the same time the collet 28 engages the core member 24 and moves axially outwardly with the core member 24. As a result of the movement of the collet 28 from the position of FIG. 2(a) to the position of FIG. 2(b), the outer frustoconical surface 28a of the collet 28 is brought into engagement with the inner frustoconical surface 26c of the sleeve 26 and axially slides within the sleeve 26. When this occurring, the axial slits 28c of the collet 28 are caused to be narrowed and the collet 28 is caused to be constricted radially inwardly, while at the same time the outer cover 34 of the hose 31 is crimped by the circumferential groove and land portions 28b of the collet 28. In this way, the hose 31 is firmly crimped by the hose fitting 21, and therefore there is no leak of the fluid within the hose fitting 21. As the diameter of the maximum diameter portion 26d of the sleeve 26 is slightly smaller than the outer diameter of the flange portion 24a of the core member 24, the collet 28 is retained at the maximum diameter portion 26d at a predetermined internal pressure. For this reason, the hose 31 is not excessively crimped by the collet 28 and the core member 24, and therefore the outer cover 34 and the intermediate reinforcing layer 33 are effectively prevented from being cut. The hose 31 is simply inserted into the hose fitting 21 as arranged in FIG. 2(a) and is connected to the hose fitting 21 with the axial outward movement of the hose 31 from the position of FIG. 2(a) to the position of FIG. 2(b) as described above. Thus, the hose fitting 21 according to the present invention requires no tools for crimping, and the hose end can be very easily connected to the hose fitting 21 in accordance with the present invention.

When the hose fitting 21 is in the fully inserted position of FIG. 2(a), the hose 31 is freely rotatable with respect to the core member 24 and the body 22 of the hose fitting 21. Thus, the hose fitting 21 can be connected to a high-pressure generating apparatus by rotating the body 22 of the hose fitting 21 without twisting the hose 31.

After the hose 31 is connected to the hose fitting 21, it is freely rotatable with respect to the body 22 of the hose fitting 21 and the sleeve 26 if the internal pressure is zero. Thus, the hose fitting 21 also can be connected to a high-pressure generating apparatus after the completion of the make-up by rotating the body 22 of the hose fitting 21 without twisting the hose 31.

Referring to FIG. 5, there is shown a hose fitting 41 constructed in accordance with a second embodiment of the present invention. The parts and members substantially identical to those of the first embodiment shown in FIGS. 1 and 2 are designated by like reference numerals for avoiding the detailed description. The second embodiment is characterized in that a short cylindrical member 42 is interposed between a radial flange portion 24a of a core member 24 and a collet 28. A hose 31 is firmly fixed at its portion 31d, which is spaced from a distal end 31c of the hose 31 by the length of the short cylindrical member 42, by the collet 28 and the core member 24. For this reason, the distal end 31c of the hose 31 is not damaged by the collet 28. Thus, as compared with the hose fitting 21 of the first embodiment, the hose fitting 41 of the second embodiment can be used at a higher pressure, and improved life of the fitting is obtained.

FIG. 6 illustrates a hose fitting 45 constructed in accordance with a third embodiment of the present invention. The parts and members substantially identical to those of the first embodiment shown in FIGS. 1 and 2 are designated by like reference numerals for avoiding the detailed description. The third embodiment shown in FIG. 6 is characterized in that a sleeve 26 is engaged by a radial flange portion 24a of a core member 24 and that a collet 28 is arranged axially outwardly of the sleeve 26. The sleeve 26 has a radially inner frustoconical surface 26c widening axially outwardly. The collet 28 has a radially outer frustoconical surface 28a widening axially outwardly at an angle corresponding to the angle of the frustoconical surface 26c of the sleeve 26, and is fixed to a body 22 of the hose fitting 45 by a recess 22e formed in the body 22 and an annular stop ring 27. The internal pressure within an axially inner small diameter bore portion 22a causes the flange portion 24a to move axially outwardly toward the sleeve 26. The sleeve 26 engaged by the flange portion 24a is moved axially outwardly so as to bring the inner frustoconical surface 26c of the sleeve into engagement with the frustoconical surface 28a of the collet 28. As a result, the collet 28 is constricted radially inwardly so that a hose end portion 31a of the hose 31 is firmly fixed at the axially outer end portion of the body 22 by the collet 28 and the core member 24.

Figure 7:
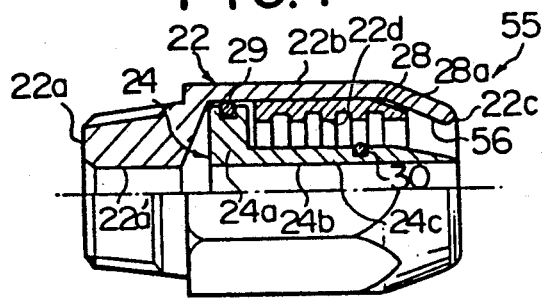
FIG. 7 is a side view, partly in section, showing a hose fitting constructed in accordance with a fourth embodiment of the present invention.
Figure 8A:
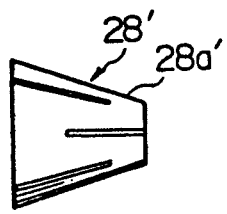
FIG. 8 (a) is a schematic view showing another modification of the collet.
FIG. 8(b) is an end view showing the collet shown in FIG. 8(b)
FIG. 8(c) is a schematic view showing another modification of the collet.
FIG. 8(d) is an end view showing the collet shown in FIG. 8(c)
FIG. 8(e) is a schematic view showing another modification of the collet.
Figure 8B:
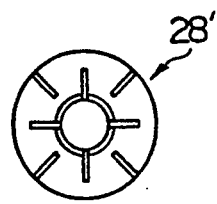
Figure 8C:
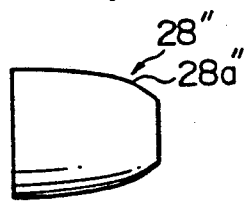
Figure 8D:
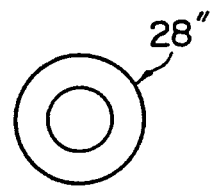
Figure 8E:
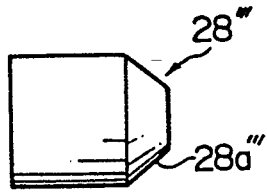

While in the aforementioned embodiments it has been described and illustrated that the sleeve 26 is formed separately from the large diameter bore portion 22b of the body 22, it is noted that the present invention may not be limited to these embodiments. The sleeve 26 may also be replaced with a frustoconical axially outwardly narrowing portion 56 integrally formed in the body 22 of a hose fitting 55 constructed as shown in FIG. 7. While it has been described and illustrated that the outer surface 28a of the collet 28 is in the form of a frustoconical surface, it is noted that it may also be an end portion 28a' of a frustoconical collet 28' shown in FIGS. 8(a) and 8(b), a curved end portion 28a'' of a collet 28'' shown in FIGS. 8(c) and 8(d), and a trapezoidal end portion 28a''' of a collet 28''' shown in FIG. 8(e).

Figure 9:
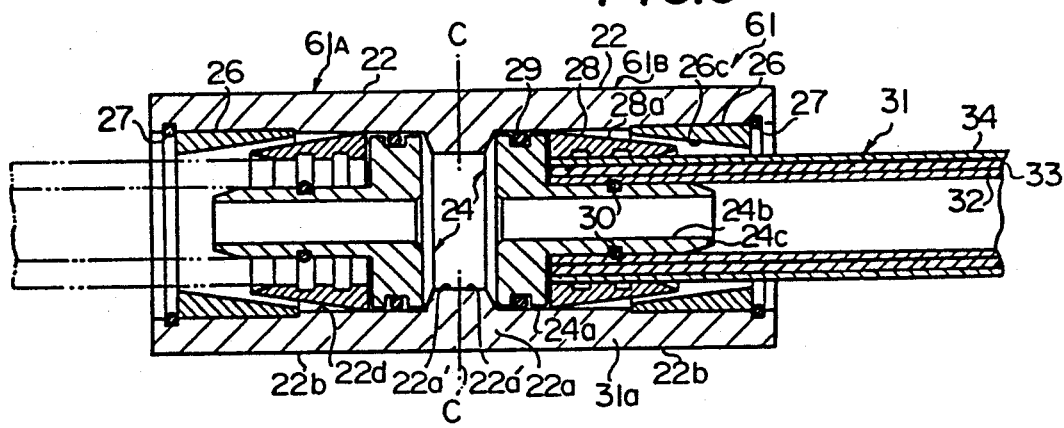
FIG. 9 is a longitudinal sectional view showing an intermediate hose fitting constructed in accordance with a fifth embodiment of the present invention.
Figure 10:
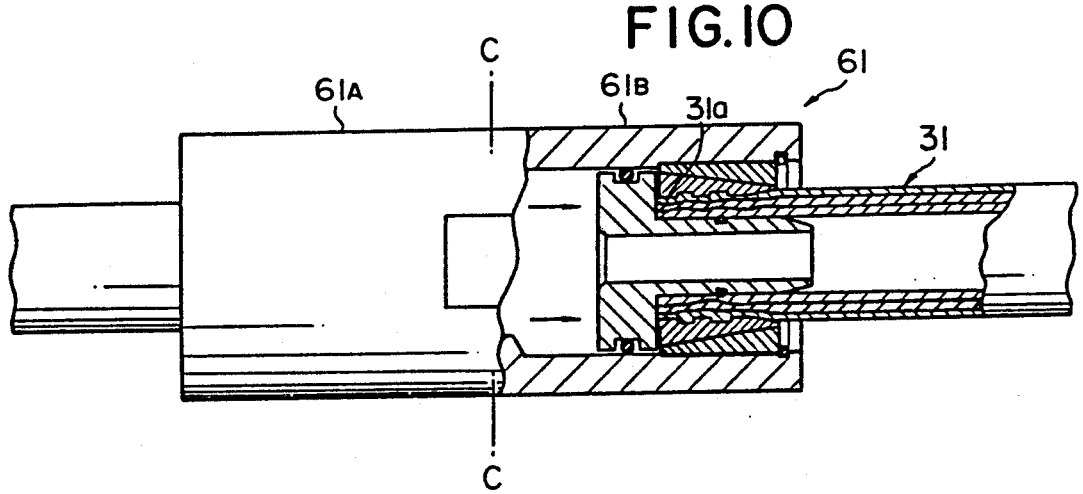
FIG. 10 is a part-sectional view showing the hose connected to the hose fitting by the axial outward movement of the core member shown in FIG. 9 from the position of FIG. 9.
Figure 11:
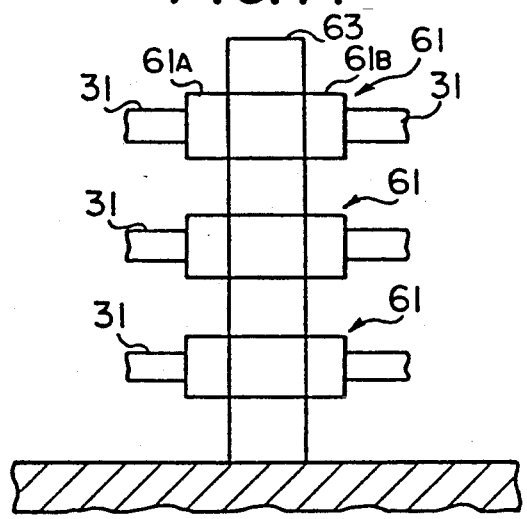
FIG. 11 schematically illustrates a plurality of the intermediate hose fitting of FIG. 9 which are mounted on a support member.

Referring to FIGS. 9, 10 and 11, there is shown an intermediate hose fitting 61 constructed in accordance with a fifth embodiment of the present invention. The parts and members substantially identical to those of the first embodiment shown in FIGS. 1 and 2 are designated by like reference numerals for avoiding the detailed description. The intermediate hose fitting 61 comprises a left hose fitting portion 61A and a right hose fitting portion 61B which are symmetrical in construction with respect to a center line C—C shown in FIG. 9 and which are connected through a central portion 22a with each other as shown. The right portion of FIG. 9 illustrates a hose 31 inserted to the fully inserted position wherein the distal end 31a of the hose 31 abuts the flange portion 24a of a core member 24, while FIG. 10 illustrates the distal end 31a of the hose 31 which is firmly fixed to the right hose fitting portion 61B by axial inward movement of the fitting portion 61B from the fully inserted position of FIG. 9. In the case the hose 31 is damaged, the hose 31 is cut to remove the damaged portion and the remaining two hoses 31 can be easily connected through the intermediate hose fitting 61 with each other as they may be simply inserted into the opposite fitting portions 61A and 61B. Thus, the intermediate hose fitting 61 according to the present invention requires no tools to effect the connection of the hoses to the hose fitting 61. As a result, the connection of one hose to another hose can be made rapidly, and the length of the hose at the time of transportation can be shortened. FIG. 11 shows a plurality of hoses 31 which are connected to opposite sides of the intermediate hose fittings 61 each fixed to a support member 63.

Figure 12:
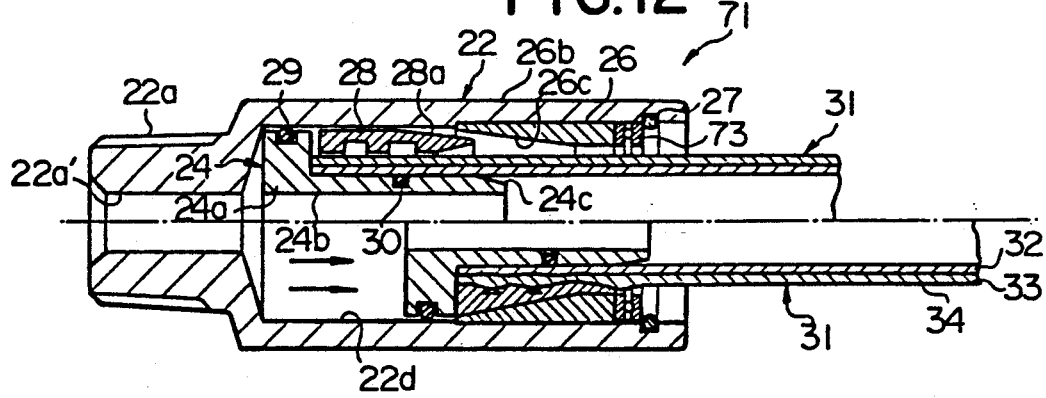
FIG. 12 is a longitudinal sectional view, partly broken away, showing a hose fitting constructed in accordance one embodiment of a second invention.
Figure 13:
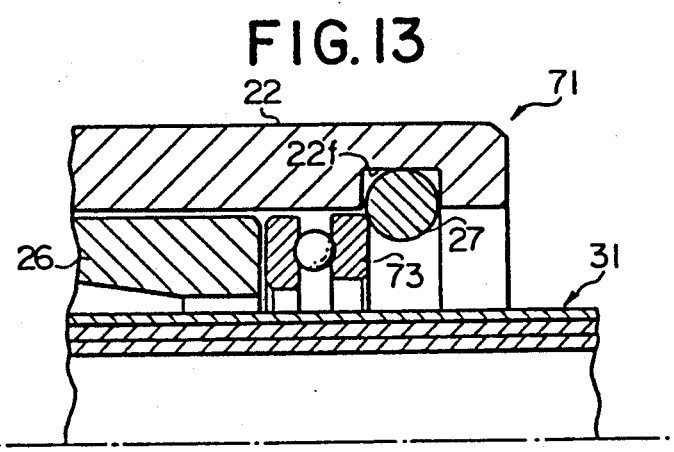
FIG. 13 is an enlarged fragmentary sectional view showing the thrust bearing interposed between the sleeve and the annular stop ring.
Figure 14:
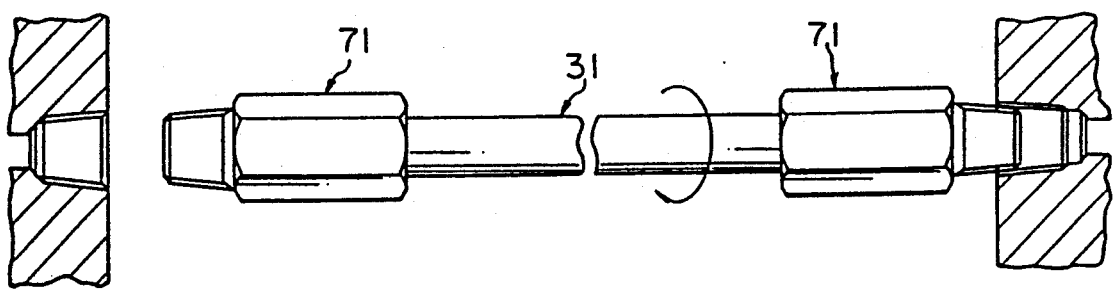
FIG. 14 is a schematic view showing the connection of the hose fitting of FIG. 12 to apparatuses.

Referring to FIGS. 12 and 13, there is shown a hose fitting 71 constructed in accordance with one embodiment of a second invention. The parts and members substantially identical to those of the first embodiment shown in FIGS. 1 and 2 are designated by like reference numerals for avoiding the detailed description. This embodiment is characterized in that the hose fitting 71 is provided with an annular thrust bearing 73 to freely rotate a retaining sleeve 26. As previously indicated, when an internal pressure is applied to the aforesaid hose fitting and when the distal end 31a of the hose 31 is fixed by the aforesaid collet 28 and sleeve 26, the sleeve 26 is axially urged against the stop ring 27. However, in this embodiment, even when the hose 31 is firmly connected to the hose fitting 71 due to the internal pressure, the body 22 of the hose fitting 71 is rotatable in the circumferential direction as the bearing 73 is provided between the sleeve 26 and the stop ring 27. For this reason, the hose 31 cannot be twisted even when the internal pressure is applied to the hose fitting 71.

Next, five kinds of samples were prepared and tested to confirm the effect of the present invention.

Figure 15:
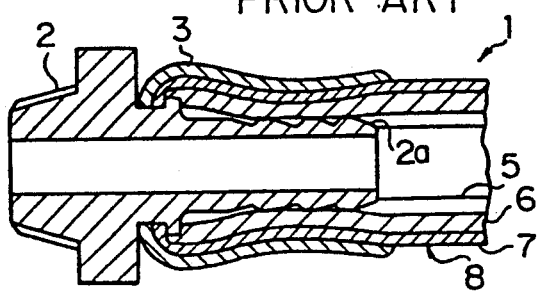
FIG. 15 is a longitudinal sectional view of a conventional hose fitting.
Figure 16A:
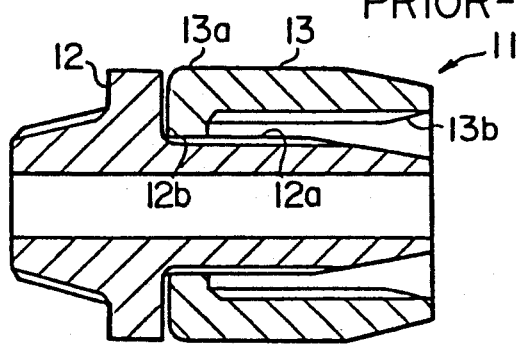
FIG. 16(a) is a longitudinal sectional view of another conventional hose fitting.
Figure 16B:
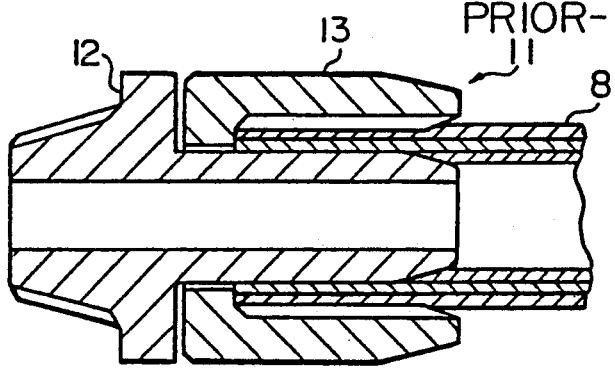
FIG. 16(b) is a longitudinal sectional view showing the connection of the conventional hose fitting of FIG. 16(a) to a hose.
Figure 17:
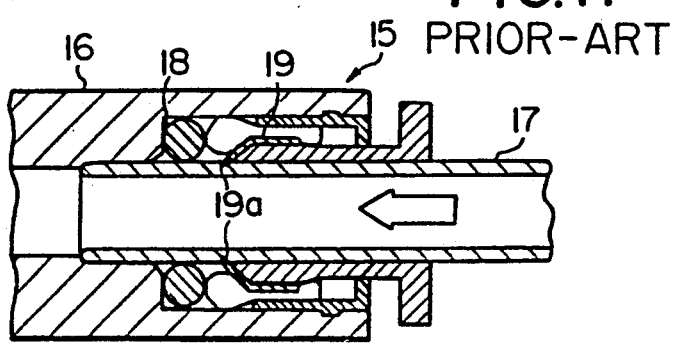
FIG. 17 is a longitudinal sectional view of still another conventional tube fitting.

The sample 1 is substantially identical to the aforementioned first embodiment shown in FIG. 1, and the inner diameter of the large diameter bore portion of the body of the hose fitting is 20 mm, the length of the collet is 15 mm, and the number of the slits is 12. The sample 2 is substantially identical to the sample except that the collet is made of polyacetal. The sample 3 is substantially identical to the aforementioned second embodiment shown in FIG. 5, and the axial length of the short cylindrical member 42 is 10 mm. The sample 4 is substantially identical to the conventional hose fitting of crimping type for 105 kgf/cm$^2$ which is shown in FIG. 15. The sample 5 is substantially identical to the conventional hose fitting shown in FIG. 17.

The test was performed regarding burst pressure tests A and A' and impulse tests B and B' in accordance with JIS (Japanese Industrial Standard) B8362-1983. In the burst pressure tests A and A', the burst pressures were measured by gradually increasing fluid pressure after the connection of the hose to the hose fitting. The burst pressure test A' was performed regarding the hoses that were subjected to the impulse test B. In the impulse tests B and B', the number of impulse cycles was compared when impulse pressures of 105 kgf/cm² and 140 kgf/cm² were repeatedly applied at a fluid temperature of 100° C. The test results are shown in Table.

TABLE

|  | Sample 1 (FIG. 1) | Sample 2* (FIG. 1) | Sample 3 (FIG. 5) | Sample 4 (FIG. 15) | Sample 5 (FIG. 17) |
|---|---|---|---|---|---|
| Burst Pressure Test A (kgf/cm²) | 550 Hose body burst away from fitting | 550 Hose body burst away from fitting | 550 Hose body burst away from fitting | 550 Hose body burst away from fitting | Hose body bulde away from fitting at 2 kgf/cm² |
| Impulse Test B (105 kgf/cm² × 100° C.) | No failure for one million time | No failure for one million time |  | No failure for one million time |  |
| Impulse Test B' (140 kgf/cm² × 100° C.) |  |  | No failure ½ million time | Fitting blew off at ½ million impulse cycles |  |
| Burst Pressure Test A' (kgf/cm²) | 540 Hose body burst away from fitting | 540 Hose body burst away from fitting |  | Leak at crimped part of fitting at 350 kgf/cm² |  |

Note: the collet of the sample 2* is made of polyacetal.

Thus, the samples 1, 2 and 3 according to the present invention, as compared with the comparative samples 4 and 5, demonstrated greatly excellent results in respect of burst pressure and impulse. The samples 1, 2 and 3 according to the present invention, as compared with the comparative sample 4, demonstrated an improved durability in the burst pressure test A', and also there are no occurrence of the separation of the hose from the hose fitting and no occurrence of the leak from the hose fitting.

From the foregoing description, it will be seen that an improved hose fitting which solves all of the drawbacks inherent in the aforementioned conventional hose fitting, is provided in accordance with the present invention.

While certain representative embodiments and details have been shown for the purpose of illustrating the invention, it will be apparent to those skilled in this art that various changes and modifications may be made therein without departing from the scope of the invention.

What we claim is:

1. A hose fitting for sealed connection to a multilayer hose, comprising:
    a first, one-piece cylindrical member having a small diameter bore portion and a large diameter cylindrical bore portion connected to said small diameter bore portion, the small diameter bore portion being formed with an axial small bore extending therethrough and the large diameter bore portion being stationary with respect to said small diameter bore portion and being formed with an axial large bore extending therethrough;
    a second cylindrical member axially slidable within said large diameter bore portion of said first cylindrical member and having a radial flange portion and an axial tubular portion extending from said radial flange portion, the radial flange portion being provided with a first sealing member and the axial tubular portion being formed with a through bore communicating with said axial bore of said small diameter bore portion of said first cylindrical member and provided with a second sealing member and said first sealing member serving to engages said first cylindrical member so that said second cylindrical member is axially slid along and on said large diameter cylindrical bore portion of said first cylindrical member, as a piston, when internal pressure is applied to said hose fitting;
    a sleeve rotatably received in said large diameter bore portion and having an inclined surface;
    a collet provided within said large diameter bore portion and having an outer surface engageable with said inclined surface of said sleeve and radially constrictible when moving axially within said sleeve, the multilayer hose being merely inserted and firmly fixed between said collet and said axial tubular portion of said second cylindrical member by axial outward movement of said collet;
    a stop member received in said large diameter bore portion and adapted to limit axial movement of said sleeve and collet; and
    means for permitting said sleeve and said collet to rotate about an axis of said first cylindrical member, the means being disposed between said sleeve and said stop member.

* * * * *